United States Patent
Eder et al.

(10) Patent No.: US 7,120,333 B2
(45) Date of Patent: Oct. 10, 2006

(54) POLARIZATION INSENSITIVE TUNABLE OPTICAL FILTERS

(75) Inventors: Haim Eder, Kiryat Ono (IL); Yoav Yadin, Haifa (IL); Jacob Scheuer, Petach Tikva (IL); Moti Margalit, Zichron Yaakov (IL)

(73) Assignee: Lambda Crossing, Ltd., Caesarea (IL)

( * ) Notice: Subject to any disclaimer, the term of this patent is extended or adjusted under 35 U.S.C. 154(b) by 110 days.

(21) Appl. No.: 10/493,248

(22) PCT Filed: Oct. 24, 2002

(86) PCT No.: PCT/IL02/00853
§ 371 (c)(1),
(2), (4) Date: Apr. 21, 2004

(87) PCT Pub. No.: WO03/036354
PCT Pub. Date: May 1, 2003

(65) Prior Publication Data
US 2004/0247227 A1 Dec. 9, 2004

Related U.S. Application Data

(60) Provisional application No. 60/330,603, filed on Oct. 25, 2001.

(51) Int. Cl.
*G02B 6/26* (2006.01)

(52) U.S. Cl. .......................... 385/27; 385/11

(58) Field of Classification Search .............. 385/27, 385/11
See application file for complete search history.

(56) References Cited

U.S. PATENT DOCUMENTS

| 4,741,588 | A | 5/1988 | Nicia et al. | |
|---|---|---|---|---|
| 5,912,748 | A * | 6/1999 | Wu et al. | 398/49 |
| 6,097,861 | A | 8/2000 | Kim et al. | |
| 6,169,828 | B1 * | 1/2001 | Cao | 385/31 |
| 6,400,856 | B1 * | 6/2002 | Chin | 385/11 |
| 6,516,112 | B1 * | 2/2003 | Jang et al. | 385/24 |
| 6,879,433 | B1 * | 4/2005 | Yamashita et al. | 359/332 |
| 2002/0163691 | A1 * | 11/2002 | Wong et al. | 359/127 |

FOREIGN PATENT DOCUMENTS

| WO | WO 9204653 | 3/1992 |
|---|---|---|
| WO | WO 0110069 | 2/2001 |
| WO | WO 0122139 | 3/2001 |
| WO | WO 0127692 | 4/2001 |
| WO | WO 0181962 | 11/2001 |

* cited by examiner

Primary Examiner—Ellen E. Kim

(57) ABSTRACT

A filter device and method are presented for filtering a multi-channel randomly polarized light signal to separate therefrom at least one specific channel. The device comprises a polarizer assembly, and a filter structure. The polarizer assembly is operable for processing the multi-channel randomly polarized light signal to split it into two multi-channel light components of a predetermined polarization identical for both of said two multi-channel light components; and for processing two identically polarized light components to produce a randomly polarized light signal. The filter structure is operable to process said two multi-channel light components of said predetermined polarization to select from each of said two light components the specific channel, and thereby produce two first output light components of the specific channel propagating through spatially separated first light paths.

8 Claims, 6 Drawing Sheets

POLARIZATION INSENSITIVE TUNABLE OPTICAL FILTERS

CROSS-REFERENCE TO RELATED APPLICATIONS

This application is a national stage application of International Patent Application PCT/IL02/00853" filed Oct. 24, 2002, which claims priority from U.S. Provisional Patent Application Ser. No. 60/330,603 filed Oct. 25, 2001, the contents of both of which are incorporated herein by reference.

FIELD OF THE INVENTION

This invention is generally in the field of optical devices for use in optical communication systems, and relates to polarization insensitive filtering of a multi-channel optical signal.

BACKGROUND OF THE INVENTION

Optical transmission systems, which are based on wavelength division multiplexing (WDM), achieve high information capacities by aggregating many optical channels, each carrying a specific wavelength band, onto a signal strand of optical fiber. A tunable filter is a critical optical element with several crucial roles in WDM communication systems. A tunable filter, which can redirect and route wavelengths, is used in conjunction with tunable lasers to create a tunable transmitter, midway in the fiber, in wavelength add and drop applications and at the receiving end in conjunction with a broad band detector for a tunable receiver.

It is also known that an optical signal traveling through an optical fiber is subject to variations in its polarization state due to the birefringence of conventional single mode optical fibers. Therefore, an optical signal of a given wavelength $\lambda_0$ with single polarization state, after traveling some distance through a fiber, will have two signal components of two orthogonal polarization modes (directions), respectively, for example (but not limited to) TE and TM polarization modes, i.e., $\lambda_0^{TE}$ and $\lambda_0^{TM}$. An optical filter must be able to filter the optical signal irrespective of its polarization state. Hence, it is of utmost importance to provide polarization independent tunable filters, which meet the following criteria:

Common central wavelength $\lambda_0$, namely, the central wavelengths of both polarizations must be equal (i.e. $\lambda_0^{TE} = \lambda_0^{TM}$;

The filter shape for both modes must be equal, i.e., $g(\lambda)_{TE} = g(\lambda)_{TM}$;

The filter loss for both polarization states must be identical i.e., $L_{TE} = L_{TM}$.

The following two solutions for the above problem are known in the art:
1. Careful control of the layer structure and refractive index of a filter device, which provides for a polarization insensitive device (K. Worhoff et al, "Birefringence Compensation Applying Double-Core Waveguiding Structures", IEEE Photon. Tech. Lett., vol. 11, pp. 206–208, (1999));
2. Polarization diversity, i.e., splitting the incoming signal into its constituent polarization modes and independently filtering each polarization separately.

FIG. 1 illustrates a prior art device (WO 01/22139) utilizing a polarization diversity scheme. This scheme is aimed at managing the polarization dependence of a microring resonator which employs two resonators serially arranged and constructed to separately filter transverse electric (TE) and transverse magnetic (TM) polarization components of a predetermined wavelength in a randomly polarized DWDM optical signal, and to recombine the separately filtered components prior to output from an optical component employing the inventive polarization diversity scheme. Here, the polarization splitting and subsequent tunable filtering are achieved by using optimized filters for the TE and TM signal.

SUMMARY OF THE INVENTION

There is a need in the art to facilitate polarization independent wavelength-selective filtering by providing a novel optical filter device and method.

The main idea of the present invention consists of applying frequency-selective filtering to two identically polarized light components either by, respectively, two identical filter elements, namely, the filter elements being optimized to the same polarization condition and centered to substantially the same frequency, or by a single bi-directional filter element optimized to the polarization condition of the input light components. The device according to the present invention thus provides for independent filtering of each polarization mode using the same filter design and construction, thus, saving on filter design, specialized construction and tunable filter control for both polarization states. This approach ensures that the above-defined criteria (i.e., common central wavelength, equal filter shapes, and identical filter loss for both polarization states) are met within manufacturable tolerances.

There is thus provided according to one aspect of the present invention, a method of filtering a multi-channel randomly polarized light signal to select therefrom at least one specific channel the method comprising:
(i) processing the multi-channel randomly polarized light signal to split it into two light components of the same predetermined polarization propagating along two spatially separated light paths, respectively;
(ii) passing said two polarized light components through a filter structure centered to the specific channel and operable to process each of said multi-channel polarized light components to select therefrom said specific channel into a first output light component, thereby producing two first output light components of the specific channel propagating through spatially separated first light paths;
(iii) combining said first light paths into a first dropping output path.

The method may also comprise rotation of the polarization of one of the first output light components into that of the other one and then recombining the first output light components into a first randomly polarized light component, and/or rotation of the polarization of one of the second output light components into that of the other one and then recombining the second output light components into a second randomly polarized light component. The polarization rotation of the first/second output light component is carried out prior to or concurrently with step (iii).

The processing of the input multi-channel randomly polarized light signal comprises splitting this light signal into two orthogonal polarization components, and applying polarization rotation to either one these light components to rotate it into that of the other light component, or to polarizations of both of these light component to rotate it into another polarization identical for both light components.

The passage of the two polarized light components through the filter structure may be implemented by using two identical filter elements, namely, centered to the same wavelength and having the same polarization condition. Alternatively, the passage of the two polarized light components through the filter structure may be implemented by using a single bi-directional filter element.

The method may also comprise further filtering of the multi-channel output of the said filter structure by passing it through a further filter structure for filtering therefrom another channel, which may and may not be directed to the same dropping channel.

According to another aspect of the present invention, there is provided a filter device for filtering a multi-channel randomly polarized light signal to separate therefrom at least one specific channel, the device comprising:

(a) a polarizer assembly for processing the multi-channel randomly polarized light signal to split it into two multi-channel light components of a predetermined polarization identical for both of said two multi-channel light components; and for processing two identically polarized light components to produce a randomly polarized light signal;

(b) a filter structure operable to process said two multi-channel light components of said predetermined polarization to select the specific channel from each of said two light components, and thereby produce two first output light components of the specific channel propagating through spatially separated first light paths.

The polarizer assembly comprises a polarization splitting/combining element that splits the input multi-channel randomly polarized light signal into two orthogonally polarized light components and/or combines two orthogonally polarized light components into a single randomly polarized light signal, and a polarization rotator accommodated either in the optical path of one of the identically polarized light components, or in the optical path of both such light components. The polarization splitting and polarization rotation can be realized using for example one of the following assemblies: Rohmboid prisms and half-wave wave retarders, planar optics waveguides (an input waveguide and two output waveguides, where by careful choice of geometry each polarization is directed to a different output waveguide), and birefringence crystals and half-wave retarders. If a birefringent crystal polarizing splitting element is used, the filter element is tunable by using mechanical, electro optic, thermo optic, free carriers injection or piezoelectric changes in the size or refractive index of the resonator rings or cladding.

The filter structure may comprise two identical filter elements, in which case the polarizer assembly includes a polarization splitter and rotator, or a single bi-directional filter element, in which case the polarizer assembly includes a polarization splitter-and-combiner and a polarization rotator. The splitter-and-combiner element may be in the form of an isolator or circulator that splits the incoming light from an input port into two outputs with identical polarization states (while counter-propagating light in these outputs is combined and directed to a different output port), and either combines incoming light from these two ports and redirects them to an additional output port or insures no incoming light from these two ports will return to the first port and optionally directs them to an additional output port.

The device may comprise a polarization splitting isolator or circulator element separating the two polarizations of the incoming signal and transforming them to two outputs of the same polarization while counter-propagating light in these outputs is combined and directed to a different output port The isolator/circulator based polarization splitting and rotation can be realized using for example one of the following configurations: standard circulator and a polarization splitter and half-wave retarder on one polarization channel, and polarization splitter and Faraday polarization rotator on both polarization channels. In the latter case, the filter element is tunable by using mechanical, electro optic, thermo optic, free carriers injection or piezoelectric changes in the size or refractive index of the resonator rings or cladding.

The bi-directional filter element may have two input/output ports and two additional output ports. In this case, light entering from each input is filtered. The extracted signal from each input is directed and outputted from the other input. The remaining channels (not filtered) exit at the additional outputs. Alternatively, the bi-directional filter element has two input ports and two output ports, in which case light from each input port is filtered, and the filtered signal is directed to an output port while not filtered light exits from the other input port. The bi-directional filter element, as well the two-element filter structure, may utilize a ring resonators (closed loop resonator), or of a combination of two or more closed loop resonator coupled to each other either parallel or serially, or a combination of both.

Preferably, the device also comprises an additional polarization combiner assembly that may be accommodated in the first light paths or the second light paths, depending on the filter structure type, or may be composed of two polarization combiner elements accommodated in, respectively, the first light paths and the second light paths.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
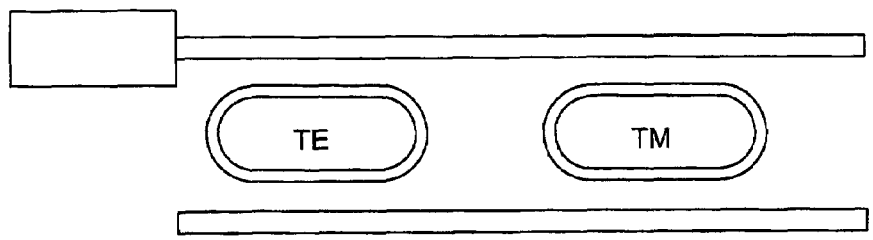
FIG. 1 is a schematic illustration of the prior art device utilizing polarization diversity.
Figure 2A:
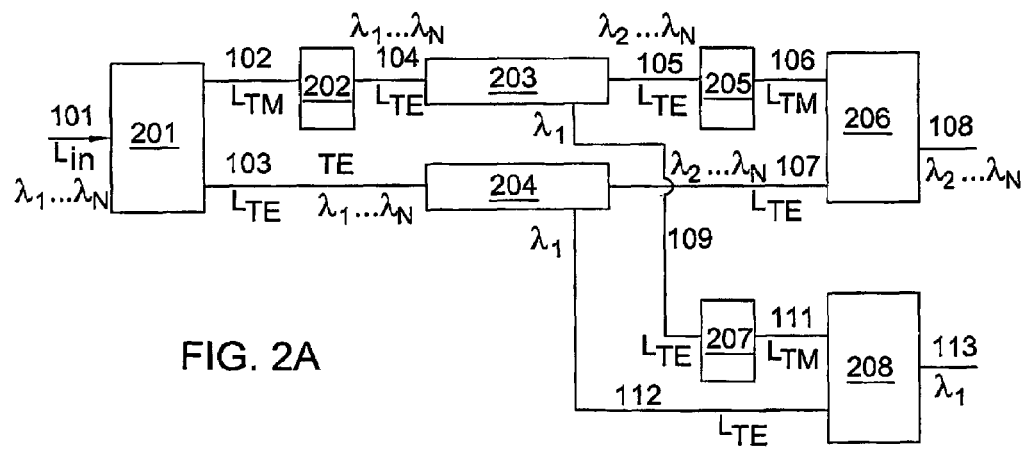
FIG. 2A is a schematic illustration of a polarization insensitive filter device according to one embodiment of the invention utilizing a filter structure composed of two identical filter elements.

Referring to FIG. 2A, there is illustrated a polarization independent, wavelength-selective filter device 100 (e.g., channel dropping filter) according to one embodiment of the invention. The filter device 100 comprises a polarizer assembly and a filter structure. In the present example, the filter structure is composed of two identical filter elements 203 and 204. Accordingly, the polarizer assembly comprises a first assembly including a polarization splitting element 201 and a polarization rotating element 202; and a second assembly including a polarization rotating element 207 (and optionally also a polarization rotating element 205), and a polarization combining element 208 (and optionally also a polarization combining element 206). The filter elements 203 and 204 are identical in their polarization conditions and functions with respect to light passing therethrough, namely, both are drop filters tuned to the same center wavelength, and optimized, for example, to TE polarized light. For example, the filter element may include a ring resonator, or a closed loop compound resonator as described in WO 01/27692 assigned to the assignee of the present application, as will be exemplified further below. The device 100 operates in the following manner.

A randomly polarized (linear, circular or elliptic) light signal $L_{in}$, which is composed of a multitude of WDM optical channels ($\lambda_1, \lambda_2, \ldots, \lambda_N$), enters the device at a light path 101, which may be an optical waveguide or optical fiber. The polarization splitting element 201 splits the incoming light signal $L_{in}$ into two light components of orthogonal polarizations $L_{TM}$ and $L_{TE}$ and direct them to light paths 102 and 103 (preferably confined in optical waveguides or fibers). For example the TM polarization component $L_{TM}$ is confined to the light path 102 and the TE polarization component $L_{TE}$ is confined to the light path 103. The polarization rotating element 202, which in the present example, is accommodated in the light path 102, applies a 90 degree polarization rotation to the polarization of the light component $L_{TM}$. Hence, two identically polarized light components $L_{TE}$ propagate through the light paths 103 and 104 to enter the filter elements 204 and 203, respectively.

The element 202 (polarization retarder) may be of any known type capable of rotating polarization of light passing therethrough, for example transferring one polarization to its orthogonal polarization. Generally, the polarization rotating element 202 may be accommodated in either one of the optical paths 102 and 103, depending on the polarization condition of the filter elements 203 and 204, to rotate the polarization of the respective light component to that of the other light component, or may be accommodated in both optical paths 102 and 103 to rotate the polarizations of both light components to the same third polarization state. In other words, the input light passage through the polarization rotating element results in two light components of identical polarization. The polarization splitting and rotation can be realized using a variety of approaches, for example one of the following: Rohmboid prisms and half-wave retarders, planar optics waveguides, birefringent crystals and half-wave retarders.

Figure 2B:
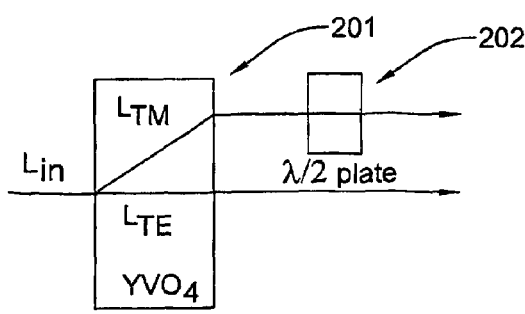
FIG. 2B schematically illustrates one specific example of the implementation of a polarizer assembly suitable to be used in the device of FIG. 2A.

FIG. 2B exemplifies one possible implementation of the polarizer assembly. As shown, the polarization splitting element 201 is in the form of a birefringent crystal allowing the propagation of one polarization component, e.g., $L_{TE}$ of the input light signal $L_{in}$ in the original direction (of the input light) and deflecting the other polarization component $L_{TM}$ of the input light a certain angle from the original direction at both input and output facets of the crystal. The polarization components $L_{TE}$ and $L_{TM}$ thus emerge from the crystal in a spaced-apart parallel relationship. The polarization rotating element 202 is a half-wave plate accommodated in the light path of the polarization component $L_{TM}$. Hence, two identically polarized light components, TE-polarized in the present example, are produced to enter two filter elements 203 and 204, respectively.

As indicated above, in the present example, the polarization rotating element 202 is associated with the light path 102, and thus two TE polarization components propagate through the light paths 103 and 104 without loss of information or disruption of the optical signal. A similar result, namely, the provision of two light components of identical polarizations, would be achieved by rotating the TE polarization in the light path 103 to the TM one, or by rotating both the TE and TM polarizations to a third polarization state equal for both light components.

Turning back to FIG. 2A, the filter element 203 receives the light component $L_{TE}$ from the light path 104, selects therefrom a specific wavelength component, e.g., $\lambda_1$ component, and directs it to a drop path 109 while allowing propagation of all other wavelength channels from the light path 104 to an output light path 105. The filter element 204 receives the light component $L_{TE}$ from the light path 103, selects therefrom the wavelength component $\lambda_1$ and directs it to a drop path 112 while allowing propagation of all other wavelength channels from the light path 103 to an output light path 107. In other words, the TE polarization component from the light path 103 transverses a similar route as the light component from 102, but does not undergo polarization rotation prior to being filtered.

To provide for a polarization insensitive channel dropping functionality of the device 100, the polarization of TE-polarization component at the light path 109 (or that of the light path 112) is rotated by the element 207 to the TM polarization state, and the two orthogonally polarized light components in the light paths 111 and 112 are recombined by the polarization combining element 208 to produce a randomly polarized output light signal $L^{(\lambda_1)}_{out}$ propagating to a dropping channel 113. Preferably, the TE light component in the light path 105 (or that in the light path 107) also undergoes the 90 degree polarization rotation by the element 205, and two orthogonally polarized light components of the light paths 106 and 107 are recombined by the polarization combining element 206 to thereby produce a multi-channel randomly polarized output light signal $L^{(\lambda_2 \ldots \lambda_N)}_{out}$ propagating to an output path 108. The output light signal in the path 113 contains substantially the dropped wavelength $\lambda_1$, and the output light signal in the path 108 contains all the other wavelength components of the input light signal.

Figure 3A:
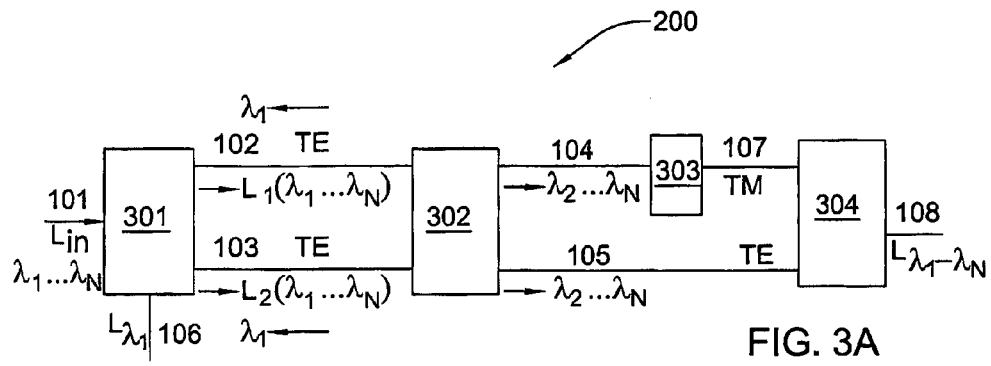
FIG. 3A is a schematic illustration of a polarization insensitive filter device according to another embodiment of the invention utilizing a filter structure composed of a single bi-directional filter element.

FIG. 3A illustrates a polarization independent, wavelength-selective filter device 200A according to another embodiment of the invention. In this embodiment, a filter structure is composed of a single bi-directional filter element 302 centered to a specific channel. Accordingly, a polarizer assembly of the device 200A may comprise a single isolator- or circulator-type polarization splitting/combining/rotating structure 301, or also a second polarizer assembly including a polarization rotating element 303 and a polarization combining element 304.

The structure 301 can be realized using a variety of approaches, for example, utilizing a standard circulator and polarization splitter and half-wave retarders, or a polarization splitter (e.g., birefringent crystal) and Faraday polarization rotators. The bi-directional filter element 301 may include a ring resonator or a closed loop compound resonator as described in the above-indicated publication WO 01/27692. These designs will be exemplified further below.

In one implementation of the device 200A, the circulator polarization splitting/combining/rotating structure 301 operates to split incoming light $L_{in}$ from one port (associated with light path 101) into two outputs $L_1$ and $L_2$ (associated with light paths 102 and 103) with identical polarization states, and operates to combine incoming light from these two paths and redirect them to an additional port (associated with output light path 106). The bi-directional filter element 302 has two input/output ports (associated with light paths 102 and 103), and may optionally have two additional output ports 104 and 105. Light entering from each input is filtered. The extracted signal from each input is directed and outputted from the other input The remaining channels (not filtered) may exit at the additional outputs.

In another implementation of the device 200A, the isolator or circulator polarization splitting/combining/rotating structure 301 operates to split incoming light from the input port (light path 101) into two output light components (light paths 102 and 103) with identical polarization states, in a manner ensuring no incoming light from these two output ports will return to the first port and optionally direct them to an additional output port 106. Possible implementations of the polarizer assembly and light combining assembly will be described below with reference to FIGS. 3B and 3C. The bi-directional filter element 302 has two input ports (associated with light paths 102 and 103), which may also serve as output ports, and has two output ports (associated with light paths 104 and 105). Light from each input port is filtered, and the filtered signal is directed to the output port. Light not filtered may exit from the other input port.

Thus, the device 200A can operate as follows. A randomly polarized (linear, circular or elliptic) light signal $L_{in}$ composed of a multitude of WDM optical channels ($\lambda_1$, $\lambda_2$, ..., $\lambda_N$) enters the device at light path 101, which may be an optical waveguide or optical fiber. The polarizer assembly 301 splits the input light signal into two orthogonal polarization components, transforms them to an identical polarization (e.g., TE polarization), and outputs the identically polarized light components at the light paths 102 and 103 that are preferably confined in optical waveguides or fibers. The filter element 302, which is a polarization sensitive drop filter optimized to the polarization of the circulator output (e.g., TE polarization), operates in the following manner: One or more optical channels (e.g., $\lambda_1$ wavelength channel) from the polarized light entering the filter at the light path 102 is output at the light path 103, while the rest of the light from the path 102 (composed of all the input channels except for the selected/dropped channel(s), i.e., $\lambda_2 \ldots \lambda_N$) is output at the light path 104. The dropped optical channel or channels ($\lambda_1$ in the present example) from the light component entering the filter at the light path 103 is output at the light path 102, and the rest of the light from the light path 103 (composed of all the input channels except for the dropped channel(s), i.e., $\lambda_2 \ldots \lambda_N$) is output at the light path 105. The dropped channels $\lambda_1$ from the light paths 102 and 103 then re-enter the circulator-based polarizer assembly 301, which combines them and outputs randomly polarized light $L_{\lambda_1}$ at light path 106. The output light components ($\lambda_2 \ldots \lambda_N$) composed of all the input channels except for the dropped channel(s) propagate through the light paths 104 and 105. The polarization of one of these light components (that of the light path 104 in the present example) can be rotated by the element 303 to the orthogonal polarization component (to TM polarization in the present example) propagating through a light path 107, and the two polarization components in the light paths 105 and 107 can be recombined by the element 304 to provide a randomly polarized output light signal $L_{\lambda_1-\lambda_N}$ in a light path 108 composed of all the channels of the input light, except for those dropped at the light path 106.

Alternatively, although not specifically shown, the filter element 302 can operate as follows: The dropped optical channel(s) (e.g., $\lambda_1$) of the polarized light entering the filter at the light path 102 is output at the light path 104, and the rest of the light from the path 102 composed of all the input channels except for the dropped channel(s), i.e., $\lambda_2 \ldots \lambda_N$) is output at the light path 103. The dropped optical channel(s) of light entering the filter at the light path 103 is output at the light path 105, and the rest of the light from the path 103 composed of all the input channels except for the dropped channel(s) is output at the light path 102. The dropped light components in the light paths 104 and 105 are then combined, for example, by rotating the polarization of one of them to the orthogonal polarization by the element 303, and then combining by the element 304 the two polarization components in the light paths 107 and 105 into a randomly polarized dropped output propagating through the light path 108. The rest of the channels in the light paths 102 and 103 which were not dropped re-enter the isolator/circulator based polarizer assembly 301, which either eliminates back reflections (isolator) or combines them and outputs randomly polarized light at the light path 106. Generally speaking depending on the construction and operation of the bi-directional filter element 302, the dropped channel(s) is output either at light path 106 or light path 108, and all other channels of the input light are output at the other light path.

Figure 3B:
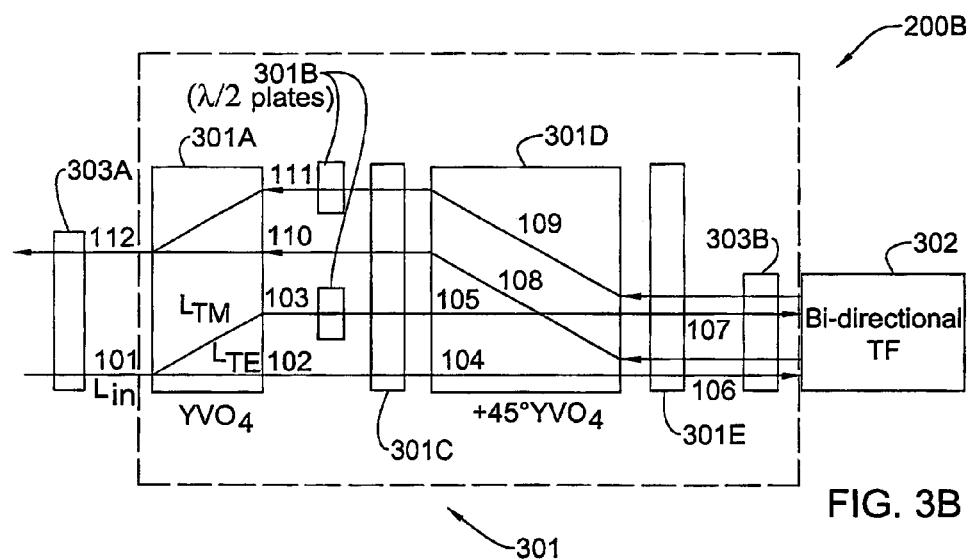
FIGS. 3B and 3C show two specific examples, respectively, of the implementation of the filter device of FIG. 3A.

FIG. 3B illustrates one specific example of the implementation of the filter device 200B utilizing a bi-directional tunable filter element. The device 200B comprises first and second collimator assemblies 303A and 303B; a polarizer assembly 301 including first and second beam splitters 301A and 301D (each realized using birefringent crystal such as YVO4), two $\lambda/2$ retarders 301B, and first and second Faraday rotators 301C and 301E; and a filter structure including a tunable bi-directional filter element 302 having two input/output ports associated with light paths 106 and 107. The device 200B operates in the following manner:

A randomly polarized multi-channel light beam $L_{in}$ enters the first collimator assembly 303A. The collimator could be realized with a single GRIN (graded index) lens for both input path 101 and output path 112 paths, or by separate lenses for each of these light paths. The collimated beam enters the first birefringent crystal 301A from the light path 101. The birefringent crystal 301A splits the light signal $L_{in}$ into TE- and TM-polarized light components propagating in light paths 102 and 103, respectively. The TM component $L_{TM}$ passes through the $\lambda/2$ retarder 301B accommodated in the light path 103, and is transformed to TE polarization. Both light components, which are TE polarized, pass through the first Faraday rotator 301C that rotates their polarization by 45°. The resulting polarized light components at light paths 104 and 105 enter the second birefringent crystal 301D with an optical axis rotated at 45°, so both polarized light components pass unchanged, and then pass through the second Faraday rotator 301E. The latter rotates the polarization of both light components by −45°, and as a result, both light components entering the second collimator assembly 303B at both its input/output ports (light paths 106 and 107) are in TE polarization state. Similar to the first collimator, the second collimator could be realized either by a single lens for both light paths or by separate lenses. The TE polarized beams then enter the bi-directional filter element 302. The light component entering the filter at one input/output port goes through the filter and comes out through the other input/output port as a filtered signal (selected or dropped channel). The dropped output light components (which are both TE-polarized) pass through the second Faraday rotator 301E, and while being −90° rotated with respect to the input light in the paths 105 or 104, are diverted by the second crystal 301D: they are deflected at the input of the crystal 301D to light paths 108 and 109 and then again deflected to emerge from the crystal along light paths 110 and 111. The two output light components, which are now TM polarized, then pass through the first Faraday rotator 301C where they are aligned back to the TE polarization state. The light component in the light path 111 passes through the $\lambda/2$ retarder 301B, is transformed to TM polarization state, and is then combined with the TE polarized component in the light path 110 by the first crystal 301A into a randomly polarized dropped (filtered) output signal emerging from the device in a dropping output channel 112.

Figure 3C:
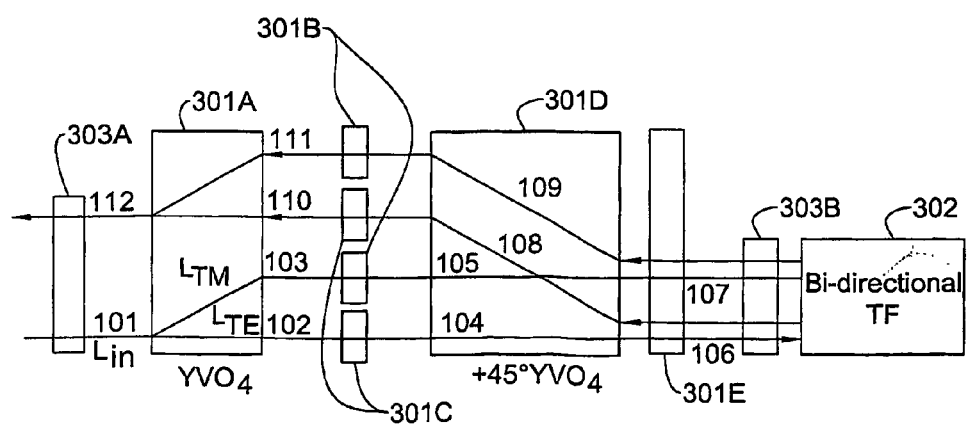

FIG. 3C illustrates another specific example of the implementation of the filter device 200B. Here, the $\lambda/2$ retarder and +45° Faraday rotator are replaced by −45° Faraday rotators 301B accommodated in light paths 102 and 110, and +45° Faraday rotators accommodated in light paths 103 and 111. This configuration introduces identical effect on the light polarization as described in the previous example.

Figure 4A:
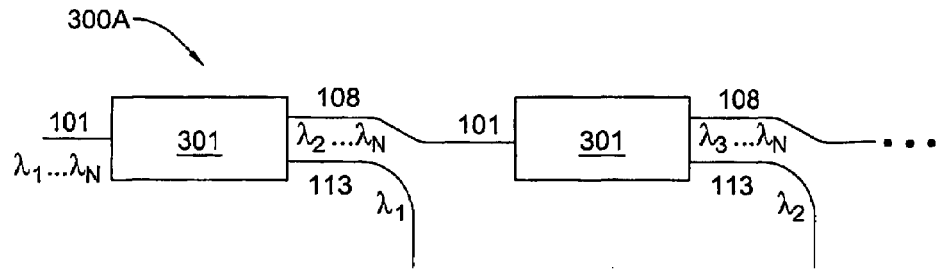
FIGS. 4A and 4B schematically illustrate two examples, respectively, of optical systems utilizing cascaded filter devices according to the invention.
Figure 4B:
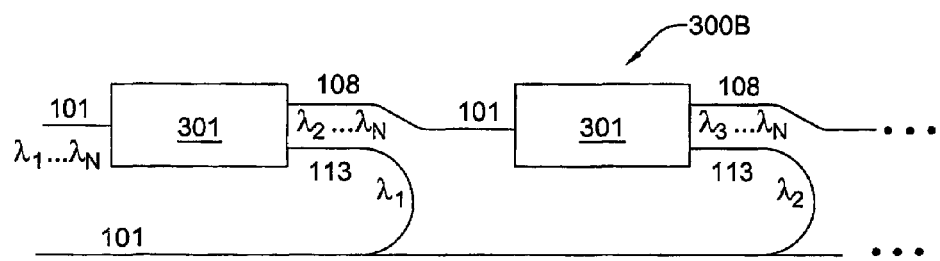

Referring to FIGS. 4A and 4B, there are illustrated optical systems 300A and 300B, each utilizing cascaded channel dropping filter devices 400. The filter device 400 is of the type described above with reference to FIGS. 2 and 3A–3B. The filter elements of different filter devices in the system 300A (or 300B) are preferably tuned to different wavelengths, respectively, and the system thus enables the dropping of multiple channels. In the example of FIG. 4A, dropped channel(s) of each filter device is output in a separate waveguide or fiber 113. In the example of FIG. 4B, the dropped channels 113 of the filter devices 400 are united to a single output waveguide or fiber 114. The cascaded filters structure may serve as an optical add-drop multiplexer (OADM) which is a key element in modern optical communication systems based on WDM.

FIGS. 5A to 5F illustrate several implementations of the filter structures suitable to be used in the device of the present invention. These filter structures utilize ring or close loop resonator structures, and various configurations provide different filtering and tuning characteristics. Ring resonators are described in the literature, and have been the subject of extensive research. Ring resonators are notoriously hard to optimize for both polarizations concurrently, yet provide highly attractive characteristics for both filtering and tuning, and hence are an important and necessary element for WDM systems.

Figure 5A:
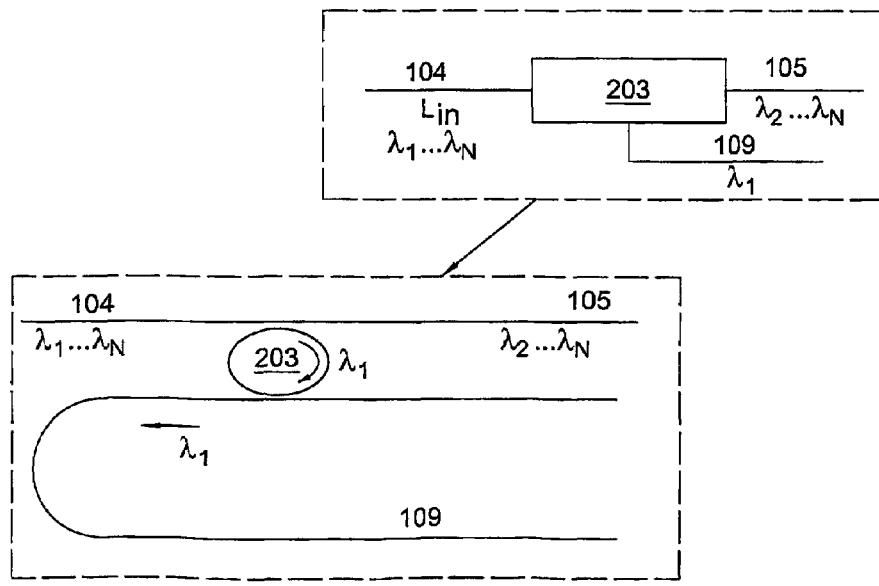
FIGS. 5A to 5F exemplify various implementations of the filter device according to the invention utilizing ring-like resonator structures.

The configuration of FIG. 5A is suitable for use in the device 100 of FIG. 2, and therefore the same reference numbers are used to identify those components which are common in the examples of FIGS. 2 and 5A. As shown in FIG. 5A, a filter structure 203 is composed of a single ring resonator, and has one input associated with a light path (waveguide) 104 for passing input multi-channel polarized light and two outputs associated with light paths (waveguides) 105 and 109 for outputting, respectively, dropped channel(s) (e.g., $\lambda_1$ component) and all other channels ($\lambda_2, \ldots, \lambda_N$) of the input light.

Figures 5B, 5C:
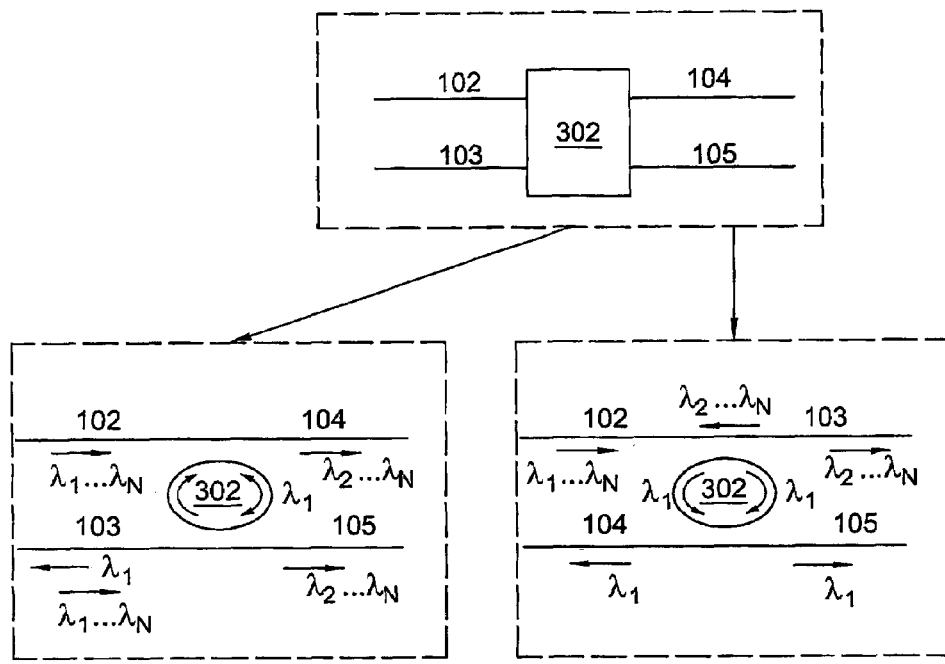

The configurations of FIGS. 5B and 5C are suitable for use in the above-described two implementations of the device 200 of FIG. 3A, and therefore the same reference numbers are used to identify those components which are common in the examples of FIGS. 3A and 5B–5C. The device 302 has two input/output ports associated with light paths 102 and 103, and two additional output ports associated with light paths 104 and 105. Multi-channel polarized light ($\lambda_1, \lambda_2 \ldots \lambda_N$) components of identical polarizations exist in the input light paths 102 and 103. In the example of FIG. 5B, the ring resonator filter element 302 selects an optical channel (e.g., $\lambda_1$ wavelength component) from the light path 102 and drops it to the light path 103, while allowing all other channels in the light path 102 ($\lambda_2 \ldots \lambda_N$) to propagate to the output light path 104, and selects the same optical channel $\lambda_1$ from the light path 103 and drops it to the light path 102, while allowing all other channels in the light path 103 ($\lambda_2 \ldots \lambda_N$) to propagate to the output light path 105. In the example of FIG. 5C, the ring resonator filter element 302 selects the optical channel $\lambda_1$ from the light path 102 and drops it to the light path 104, while allowing all other channels in the light path 102 to be output through the light path 103, and selects the same optical channel $\lambda_1$ from the light path 103 and drops it to the light path 105, while allowing all other channels in the light path 103 ($\lambda_2 \ldots \lambda_N$) to be output through the light path 102.

Figure 5D:
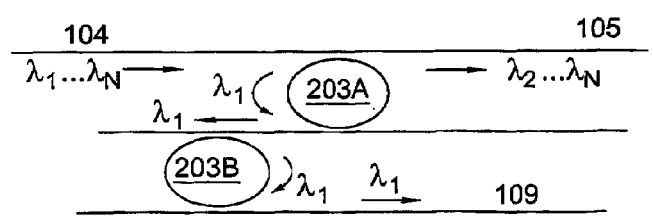
Figure 5E:
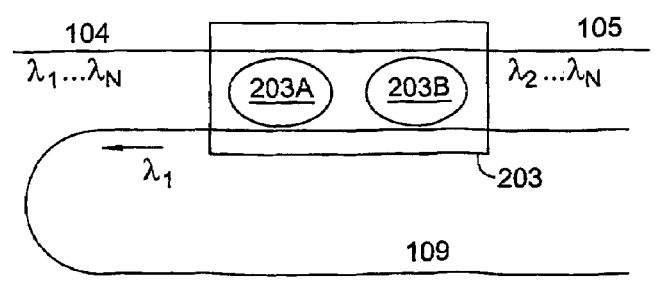
Figure 5F:
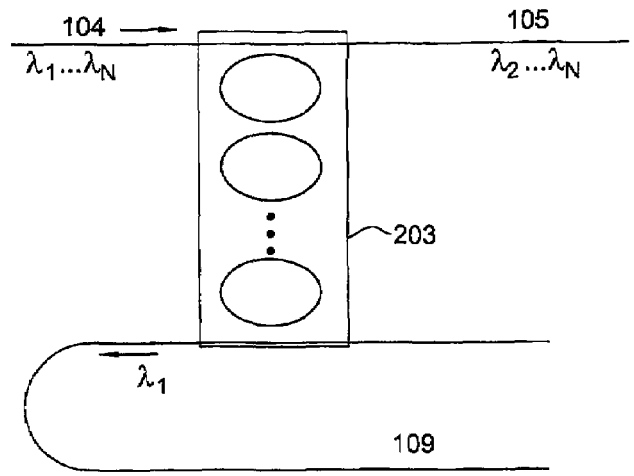

FIGS. 5D and 5E exemplify the double-ring designs of a filter element 203 suitable to be used in a filter device of the present invention: two ring resonators 203A and 203B accommodated in a cascade fashion (FIG. 5D) thereby performing the so-called double-stage filtering, and parallel coupled ring resonators 203A and 203B (FIG. 5E). Such parallel coupled ring resonators presents a closed loop compound resonator structure formed by two ring resonators 203A and 203B accommodated in a spaced-apart parallel relationship between two waveguides 104–105 and 109 and optically coupled to each other via respective segments of these waveguides. This concept is described in the above-indicated publication WO 01/27692 assigned to the assignee of the present application. FIG. 5F shows a filter element 203 in the form of multiple cascaded ring resonators.

Figure 6A:
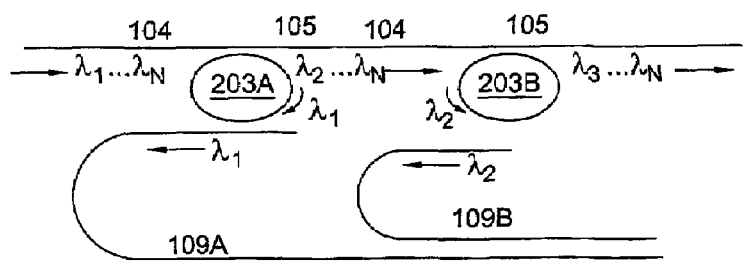
FIGS. 6A to 6C exemplify three different implementations, respectively, of for OADM optical systems utilizing multiple filter structures using multiple output waveguides for multiple dropped channels, and a single output waveguide for multiple dropped channels.
Figure 6B:
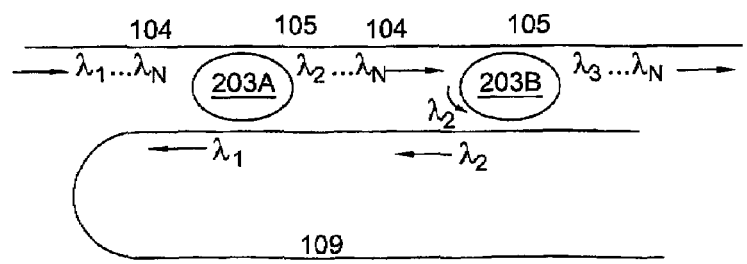
Figure 6C:
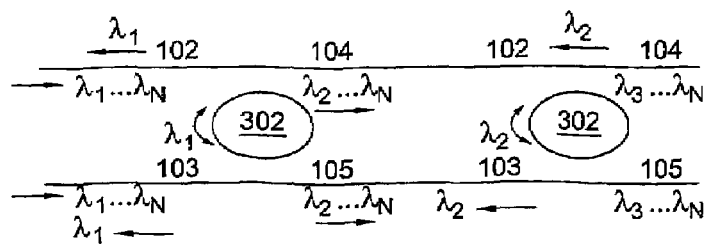

Reference is now made to FIGS. 6A to 6C, schematically illustrating various implementations of an OADM system based on cascaded channel drop filter elements. In the example of FIG. 6A, the multiple filter elements (two such elements 203A and 203B being shown in the figure) are associated with multiple output waveguides 109A and 109B, respectively. A polarized multi-channel light signal ($\lambda_1 \ldots \lambda_N$) propagates in a light path 104, and upon reaching an interaction region with the ring resonator 203, undergoes frequency filtering by the element 203A: a specific channel, e.g., $\lambda_1$, is directed to the output light path 109A, and all other channels $\lambda_2 \ldots \lambda_N$ propagate to a light path 105, which serves as an input light path 104 for the next filter element 203B tuned to a further channel, e.g., $\lambda_2$, to filter it out of the input light and direct to the further output light path 109B, and so on.

In the example of FIG. 6B, the multiple filter elements 203A, 203B, and so on are associated with a single output waveguide 109. Each filter element operates similar to that of the above-described example with reference to FIG. 2.

In the example of FIG. 6C, each filter element is a bi-directional filter similar to that of FIG. 3A, and all the filter elements are associated with a common output path for a dropped channel, and a common output path for all the other channels of the input light. The operations of these devices are shown in the figures in a self-explanatory manner.

Figure 7A:
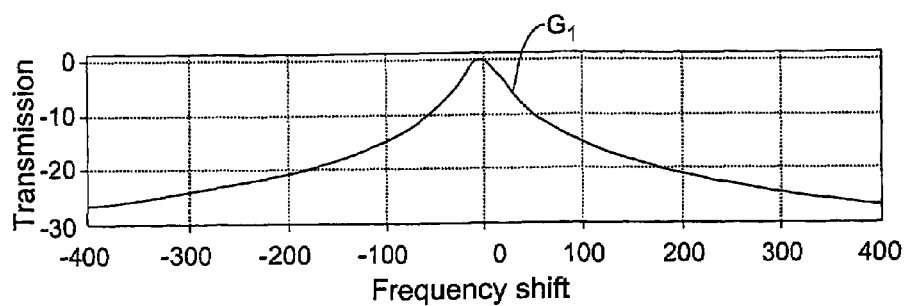
FIGS. 7A to 7C illustrate graphs of the transfer function of ring resonators based filters for, respectively, a single resonator, a cascaded double resonator, and parallel coupled ring resonators.
Figure 7B:
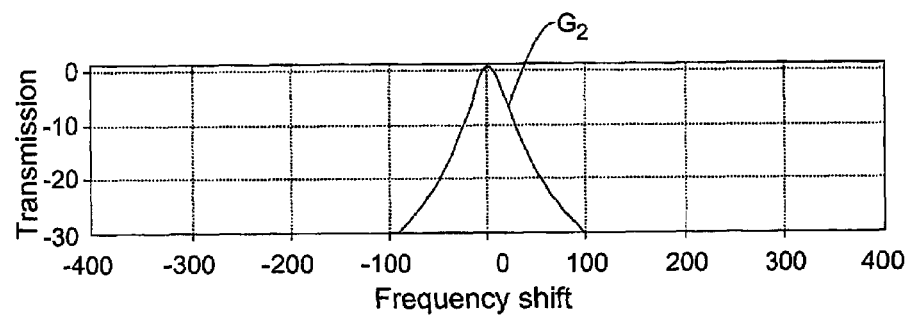
Figure 7C:
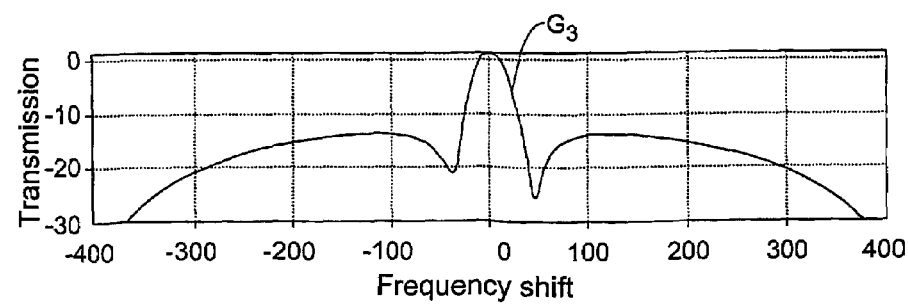

FIGS. 7A to 7C illustrate the transfer functions of tunable filters based on ring resonators in the serial and parallel configurations. Graphs $G_1$, $G_2$ and $G_3$ of FIGS. 7A–7C, respectively, correspond to the transfer function (transmission as a function of frequency) of a single resonator (FIG. 5A above), cascaded double resonator or two-stage resonator (FIG. 5D) and parallel coupled ring resonators or close loop compound resonator (FIG. 5E).

The low loss propagation of the optical mode in the ring waveguide is obtained by utilizing a high refractive index contrast between the waveguide and surrounding material. The ring may be composed of optical glass with a refractive index between 1.6 and 2.3, may be made from Silicon (Si, refractive index of 3.5), or may be a combination of layered materials as described in WO 01/81962 assigned to the assignee of the present application.

The ring manifests itself on frequencies to which it is resonant. The resonant frequency of the ring, $f_0$, is given by, $$f_0 = \frac{Mc}{2\pi R n_{ef}} \quad (1)$$

wherein R is the ring radius measured from the center of the ring to the middle of the ring waveguide, $n_{ef}$ is the effective refractive index of the ring waveguide, M is an integer value, and c is the speed of light in vacuum.

The coupling between the ring and waveguide is an important quantity in determining the characteristics of the resulting device since it determines the optical bandwidth and photon lifetime, hence the modulation efficiency.

The power exchange between the waveguide and ring is denoted by $k^2$ and can be calculated by computing the overlap integral of the modes of the ring and waveguide multiplied by the length of an interaction region between them. The optical bandwidth, $\Delta f$ (FWHM), is then given by the formula:

$$\Delta f = \frac{k}{\pi\sqrt{1-k}} \cdot FSR \quad (2)$$

wherein k is the coupling coefficient, and FSR is the resonator free spectral range.

An individual ring (configuration of FIG. 5A) can be described as a two-port device. The throughput function describing the ring optical amplitude characteristics is given by:

$$T(\omega) = \frac{1}{\sqrt{1-k}} \frac{(1-k)(1-e^{j\omega})}{1-(1-k)e^{j\omega}} \quad (3)$$

while the drop function is given by:

$$D(\omega) = -\frac{k}{1-(1-k)e^{j\omega}} \quad (4)$$

wherein $\omega$ is the normalized radial frequency given by $\omega = 2\pi f/FSR$.

The matrix describing one ring is given by:

$$M_{Ring} = T^{-1}\begin{bmatrix} T^2 - D^2 & D \\ D & 1 \end{bmatrix}$$

Complex structures are obtained by multiplying the matrixes of the corresponding sections, as presented in WO 01/27692 assigned to the assignee of the present application.

Thus, the present invention provides for a channel dropping filter device, which acts irrespective of the polarization of an optical signal containing a plurality of optical channels. By using a polarization splitter, retarder element, and two identical channel dropping filters or one bi-directional channel dropping filter, efficient polarization free energy transfer of specific channel(s) from the input optical signal can be provided, as well as the polarization free transmission of the plurality of channel (s) which are not dropped. By using a plurality of filters, a 1×N channel dropping filter structure is provided. A plurality of output waveguides provides for N output dropped channels. Yet another embodiment involves tunable filters which provide for multiple channels at the output of the waveguide.

Those skilled in the art will readily appreciate that various modifications and changes can be applied to the embodiments of the invention as hereinbefore descried without departing from its scope defined in and by the appended claims.

In the method claims, which follow, characters that are used to designate claim steps are provided for convenience only, and do not apply to any particular order of performing the steps.

We claim:

1. A filter device for filtering a multi-channel randomly polarized light signal to select therefrom at least one specific channel, the device comprising:

(a) a polarizer assembly for processing the multi-channel randomly polarized light signal to split it into two multi-channel light components of a predetermined polarization identical for both of said two multi-channel light components and for processing two identically polarized light components to produce a randomly polarized light signal; and (b) a filter structure comprising two identical filter elements exhibiting substantially identical wavelength dependent response operable to process said two multi-channel light components of said predetermined polarization to select from each of said two light components a specific channel and thereby produce two first output light components of the specific channel propagating through spatially separated first light paths, wherein the two identical filter elements are tunable to said predetermined polarization condition and said selected channel by using one of the following effects: mechanical, electro optic, thermo optic, free carriers injection, and piezoelectric changes in the size or refractive index.

2. A filter device for filtering a multi-channel randomly polarized light signal to select therefrom at least one specific channel, the device comprising:

(a) a polarizer assembly for processing the multi-channel randomly polarized light signal to split it into two multi-channel light components of a predetermined polarization identical for both of said two multi-channel light components, and for processing two identically polarized light components to produce a randomly polarized light signal; and (b) a filter structure comprising two identical filter elements exhibiting substantially identical wavelength dependent response operable to process said two multi-channel light components of said predetermined polarization to select from each of said two light components a specific channel and thereby produce two first output light components of the specific channel propagating through spatially separated first light paths, wherein each of the two identical filter elements of said filter structure comprises a first close loop resonator centered to the specific channel.

3. The device according to claim 2, wherein said first close loop resonator is accommodated between and optically coupled to two waveguides, for propagation of, respectively, one of the two spatially separated identically polarized light components and an output light signal of the specific channel.

4. The device according to claim 2, wherein each of the two identical filter elements of said filter structure comprises a second close loop resonator, the first and second close loop resonators being centered to said specific channel and arranged in a spaced-apart parallel relationship between said two waveguides, thereby presenting a close loop compound resonator, in which each resonator is optically coupled to said waveguides, and the resonators are optically coupled to each other through linear sections of said waveguides between the resonators.

5. The device according to claim 2, wherein each of the two identical filter elements of said filter structure has at least one additional close loop resonator, said first and said at least one additional close loop resonators being centered to said specific channel and being arranged in a cascaded fashion between said two waveguides.

6. The device according to claim 5, wherein each of said first and said at least one additional close loop resonators are directly optically coupled to each other.

7. The device according to claim 5, wherein each said first and said at least one additional close loop resonators are optically coupled to each other through an additional waveguide.

8. A filter device for filtering a multi-channel randomly polarized light signal to select therefrom at least one specific channel, the device comprising:

(a) a polarizer assembly for processing the multi-channel randomly polarized light signal to split it into two multi-channel light components of a predetermined polarization identical for both of said two multi-channel light components, and for processing two identically polarized light components to produce a randomly polarized light signal;

(b) a filter structure comprising two identical filter elements exhibiting substantially identical wavelength dependent response operable to process said two multi-channel light components of said predetermined polarization to select from each of said two light components a specific channel, and thereby produce two first output light components of the specific channel propagating through spatially separated first light paths; and (c) an additional filter structure centered to an additional channel of the input light different from said specific channel, said additional filter structure being accommodated at output of the first filter structure and operating to receive and process light from two second light paths each containing all other channels of the input light except for said specific channel, to select therefrom light of said additional channel.

* * * * *